Sept. 15, 1936.  G. L. JECK  2,054,327
COOKING STOVE OR RANGE
Filed March 22, 1934
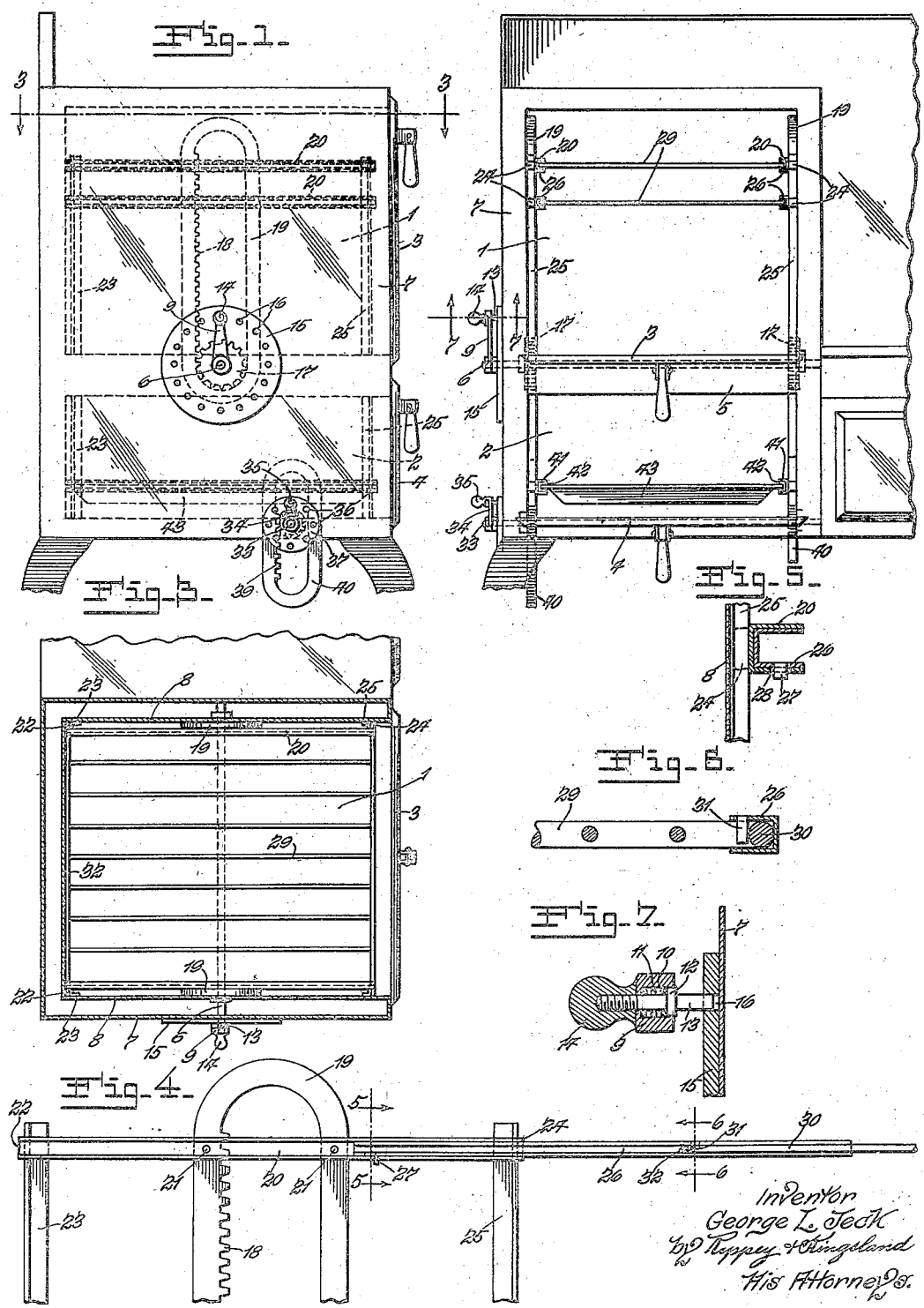
Inventor
George L. Jeck
by Rippey & Kingsland
His Attorneys Patented Sept. 15, 1936

2,054,327

UNITED STATES PATENT OFFICE 2,054,327

COOKING STOVE OR RANGE

George L. Jeck, St. Louis, Mo.

Application March 22, 1934, Serial No. 716,764

1 Claim. (Cl. 126—337)

This invention relates to cooking stoves or ranges, and has special reference to improvements in the ovens thereof.

An object of the invention is to provide improved means for supporting and adjusting vertically in the oven of a cooking stove or range a grid upon which the articles or materials to be baked or broiled are mounted.

Another object of the invention is to provide an improved vertically adjustable grid in the oven of a cooking stove or range comprising sliding supports for supporting the grid, so that the grid may be moved outwardly through the open front of the oven irrespective of the height at which the grid is supported in the oven.

Another object of the invention is to provide improved means for operating the grid to different adjusted positions in the oven and the latch device for holding said operating means against accidental displacement.

Other objects of the invention will be apparent from the following description, reference being made to the accompanying drawing, in which—

Fig. 1 is an end elevation of an oven of a cooking stove or range having my present invention embodied therein.

Fig. 2 is a front view, the doors of the oven being open.

Fig. 3 is a horizontal sectional view approximately on the line 3—3 of Fig. 1 looking downwardly toward the vertically adjustable grid.

Fig. 4 is a detail view showing the longitudinally movable support for the longitudinally movable grid.

Fig. 5 is an enlarged cross sectional view on the line 5—5 of Fig. 4.

Fig. 6 is a similarly enlarged cross sectional view on the line 6—6 of Fig. 4.

Fig. 7 is an enlarged sectional view on the line 7—7 of Fig. 2 showing the latch device whereby the grids are held against accidental movement.

In the invention shown, the cooking stove or range includes a baking oven 1 below which is a broiler oven 2. A door 3 is operative to open and to close the front opening to the baking oven 1 and a separately operable door 4 is movable to positions to open and to close the open front of the broiler oven 2. The frame part 5 extends transversely between the front portion of the two ovens immediately below the door 3 and in position to be engaged by the upper portion of the door 4 when the door 4 is closed. The usual or any preferred fuel burner is within the oven structure to the rear of the frame part 5 below the baking oven 1 and above the broiler oven 2, in accordance with familiar practice.

A shaft 6 extends transversely across the lower portion or below the lower end of the oven 1 through the outer oven wall 7 and through the oven liner walls 8. A crank arm 9 is attached to the outer end of the rod or shaft 6 and is formed with a socket 10 enclosing a spring 11, one end of which seats against the bottom of said socket and the other end of which bears against a collar 12 on a latch rod 13 supported by the arm 9 for sliding movements. A knob or handle 14 is detachably screwed on the outer end of the latch rod 13 and is engageable and operative to move said latch rod 13 outwardly in a longitudinal direction in opposition to the spring 11. A member 15 is attached to the wall 7 and is provided with an annular series of holes 16 into and out of which the inner end of the rod 13 is movable in order to hold the crank arm 9 and thereby the shaft or rod 6 stationary and prevent rotation thereof. In order to rotate the rod or shaft 6, it is only necessary to move the latch rod 13 outwardly out of the hole 16 in which it is engaged. Then the crank arm 9 may be turned to rotate the rod or shaft 6 in the direction desired and the latch rod 13 engaged in the corresponding hole 16 to prevent further or accidental turning of said rod or shaft 6.

A pair of pinions 17 are attached to the rod or shaft 6 adjacent to the inner surfaces of the oven liner walls 8 and are in permanent mesh with racks 18 formed on the inner sides of vertically movable frames 19.

A pair of channel bars 20 are attached to each frame 19 by fasteners 21, the channels of said bars being toward each other. The rear ends of said bars 20 have laterally bent portions 22 engaging the rear edges of vertical angle bars 23, constituting guides and cooperating with the frames 19. The front ends of the bars 20 have laterally bent portions 24 engaging the front edges of angle bars 25. The fasteners 21 for each bar 20 are spaced substantially forwardly and rearwardly and are at opposite sides of the openings in the frames 19 and near the margins of said frames. Thus, the frames 19 are supported and guided vertically and are prevented from tilting forwardly or rearwardly to any substantial extent.

An angle bar 26 is mounted for longitudinal sliding movements forwardly and rearwardly in each angle bar 20 and is held from displacement therefrom by a projection 27 from the angle bar 26 engaging in a slot 28 in the angle bar 20. Thus, the angle bars 26 are held on the angle bars 20 and extent of movement thereof is limited by the length of the slots 28.

A grid frame 29 has its side members 30 mounted in and supported by the angle bars 26. Said grid frame is movable longitudinally along the angle bars 26, extent of outward movement of said grid frame being limited by lugs 31 projecting from the angle bars 26 in position to be engaged by the rear members 32 of the grid frame.

As shown, there are two of these grid frames supported by the frames 19 within the oven 1 and said grid frames are spaced vertically one above the other. They are of duplicate construction and the foregoing description suffices for both.

A rod or shaft 33 is rotatively supported by the walls 7 and 8 below the broiler oven 2 and is equipped on its outer end with an operating crank 34 having a spring actuated latch member and handle 35, similar to the spring actuated latch member and handle 13—14 in connection with the crank arm 9 and operating to engage in holes 36 in a member 37, similar to the manner in which the latch member 13 engages in the holes 16 in the member 15. Pinions 38, attached to the rod or shaft 33, mesh with racks 39 on the inner sides of frames 40. Channel bars 41, similar to the channel bars 20, are attached to the frame 40 and engage the guides 23 and 25 in like manner. Channel bars 42, similar to the channel bars 26, are mounted for sliding movements forwardly and rearwardly in the channel bars 41 and are guided and limited in their movements in the same way that the channel bars 26 are guided and limited in their movements. A pan or other support 43 is removably mounted in and supported by the sliding supports 42 and by operation of said supports 42 may be moved into and out of the broiler oven.

This improvement may be embodied in ovens of most any construction now in general use. The device may be constructed and mounted in the ovens without difficulty and at low cost. By vertical adjustment of the frames in the baking oven and by vertical adjustment of the support 43 in the broiler oven, best results and effects may be obtained.

The construction and arrangement of the parts comprising the invention may be varied within the scope of equivalent limits without departure from the nature and principle of the invention.

I claim:

In an oven the combination of a top, a bottom having slots therethrough near its side edges, a rear wall, a front wall provided with a door, side walls extending below the bottom and having openings in the extensions, a shaft located in the openings, gear wheels fixed to the shaft, one near each end, an elliptical frame extending through each slot in the bottom and surrounding both the shaft and a gear wheel thereon, a series of inwardly projecting rack teeth on each elliptical frame meshing with a gear wheel the distance between the bottom of the throats between the gear teeth and the inner side of the opposite bar of the elliptical frame being the same as the over all diameter of the gear on the shaft, alining shelf-carrying guide bars fixed in a horizontal plane to each bar of the elliptical frame, a slidable shelf mounted in the guide bars, lugs on the slidable shelf to contact a portion of the oven and prevent the slidable shelf from disengaging the guide bars, a slide telescoping with the slidable shelf, means to prevent the telescoping slide from disengaging the shelf, means for rotating the shaft to raise and lower the elliptical frames simultaneously whereby articles carried on the shelf and the slide may be located in any desired zone in the oven and means for holding the article carrying elements rigidly in the selected zone.

GEORGE L. JECK.